US007522373B2

(12) United States Patent
Goodman et al.

(10) Patent No.: US 7,522,373 B2
(45) Date of Patent: *Apr. 21, 2009

(54) BURST COMMUNICATIONS VIA A BUS BAR AND BUS BAR RELAY FOR AN AUTOMATED DATA STORAGE LIBRARY

(75) Inventors: Brian Gerard Goodman, Tucson, AZ (US); Glen Alan Jaquette, Tucson, AZ (US); Leonard George Jesionowski, Tucson, AZ (US); Mark Delorman Schultz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

This patent is subject to a terminal disclaimer.

(21) Appl. No.: 11/260,933

(22) Filed: Oct. 27, 2005

(65) Prior Publication Data

US 2007/0097542 A1    May 3, 2007

(51) Int. Cl.
*G11B 15/68* (2006.01)
(52) U.S. Cl. .................................. 360/92.1; 369/30.38

(58) Field of Classification Search ................. 360/92.1; 369/30.38–30.63
See application file for complete search history.

(56) References Cited

U.S. PATENT DOCUMENTS

2003/0123341 A1* 7/2003 Ostwald et al. .......... 369/30.43
2004/0196587 A1* 10/2004 Gupta et al. .................. 360/92

* cited by examiner

*Primary Examiner*—A. J. Heinz
(74) *Attorney, Agent, or Firm*—John H. Holcombe

(57) ABSTRACT

An automated data storage library with storage shelves, data storage drive(s), a bus bar; and a robot accessor with a drive system for moving the robot accessor, an accessor communication interface, a bus bar relay configured to engage and disengage the bus bar; and a robot control configured to operate the drive system to move the robot accessor, to operate a picker, and to operate the bus bar relay to engage the bus bar when the robot accessor is stationary, to provide communication capability with a library communication interface via the bus bar relay and the bus bar when the bus bar relay engages the bus bar. Additionally, a second communication system may be provided between the robot accessor and the automated data storage library, which is operable at least when the robot accessor is moving.

25 Claims, 4 Drawing Sheets

BURST COMMUNICATIONS VIA A BUS BAR AND BUS BAR RELAY FOR AN AUTOMATED DATA STORAGE LIBRARY

FIELD OF THE INVENTION

This invention relates to automated data storage libraries and, more particularly, to communication with the robot accessor of the automated data storage library.

BACKGROUND OF THE INVENTION

Automated data storage libraries provide access to data storage cartridges which are typically stored in storage shelves and accessed by a robot accessor having a picker configured to access and deliver data storage cartridges to and from storage shelves and one or more data storage drives. The robot accessor typically moves back and forth among the storage shelves and data storage drives, and positions the picker at the desired storage shelf or data storage drive. Communication is provided to the robot accessor, for example, as commands or signals to make the desired moves, or as address information so that a processor of the robot can determine the desired moves. Additionally, a detector may be mounted on the robot accessor or picker to read information from the shelves, markers within the library, and/or from labels on the data storage cartridges.

Communication with the robot accessor is typically made via a flexible cable which unwinds and winds in accordance with the movement of the robot accessor. The flexible cable has certain disadvantages including the possibility of breakage, difficulty in turning corners or crossing aisle intersections, and the need to replace the cable when the library is expanded. Other techniques include wireless radio and infrared communications. Radio poses security and interference risks, while infrared or other optical means can have interference and line-of-sight concerns.

SUMMARY OF THE INVENTION

Automated data storage libraries, robot communication systems, and computer program products are provided.

In one embodiment, an automated data storage library comprises a plurality of storage shelves, at least one data storage drive, a bus bar, a library communication interface configured to communicate with the bus bar, and a robot accessor. The robot accessor comprises a picker configured to access and deliver data storage cartridges to and from the storage shelves and the data storage drive(s), a drive system configured to move the robot accessor and to position the picker, at least such that the picker may be positioned to access and deliver the data storage cartridge(s), an accessor communication interface, a bus bar relay configured to engage and disengage the bus bar; and a robot control configured to operate the drive system to move the robot accessor, to operate the picker, to operate the bus bar relay to engage the bus bar when the robot accessor is stationary, and to operate the accessor communication interface to provide communication capability with the library communication interface via the bus bar relay and the bus bar when the bus bar relay engages the bus bar.

In a further embodiment, the automated data storage library additionally comprises a second communication system between the robot accessor and the automated data storage library, the second communication system operable at least when the robot accessor is moving.

In another embodiment, the second communication system is a low bandwidth communication system as compared to communication bandwidth between the accessor interface and the library communication interface via the bus bar relay and the bus bar.

In still another embodiment, the second communication system comprises an optical communication system.

In a still further embodiment, the second communication system comprises an RF communication system.

In another embodiment, the second communication system comprises a roller and bus communication system.

In still another embodiment, the second communication system comprises a brush and bus communication system.

In a further embodiment, the robot control is additionally configured to stop the robot accessor if, while the bus bar relay is disengaged, communication of the second communication system is lost for a predetermined threshold.

In another embodiment, a power supply is configured to supply power to the bus bar, and a power storage system of the robot accessor is configured to receive power via the bus bar relay when it engages the bus bar. Thus both communications and power may be provided via the bus bar and bus bar relay.

In a further embodiment, the robot control is configured to determine if the bus bar relay engages the bus bar and, if so, to signal the engagement via the accessor communication interface, e.g. so the power supply may be activated.

In another embodiment, a computer program product is configured to operate a programmable computer processor of a robot accessor of an automated data storage library, and comprises computer program code configured to operate the programmable computer processor to operate a drive system to move the robot accessor, to operate a bus bar relay to engage a bus bar of the automated data storage library when the robot accessor is stationary, and to disengage the bus bar of the automated data storage library when the robot accessor is moving; and to operate an accessor communication interface to provide communication capability over the bus bar relay and the bus bar when the bus bar relay engages the bus bar.

In a further embodiment, the computer program product computer program code is configured to operate the programmable computer processor to operate a second communication system of the robot accessor at least when the robot accessor is moving.

In another embodiment, the computer program product computer program code is configured to operate the programmable computer processor to operate the second communication system in a low bandwidth mode as compared to communication bandwidth of the accessor interface.

In still another embodiment, the computer program product computer program code is configured to operate the programmable computer processor to stop the robot accessor if, while the bus bar relay is disengaged, communication of the second communication system is lost for a predetermined threshold.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
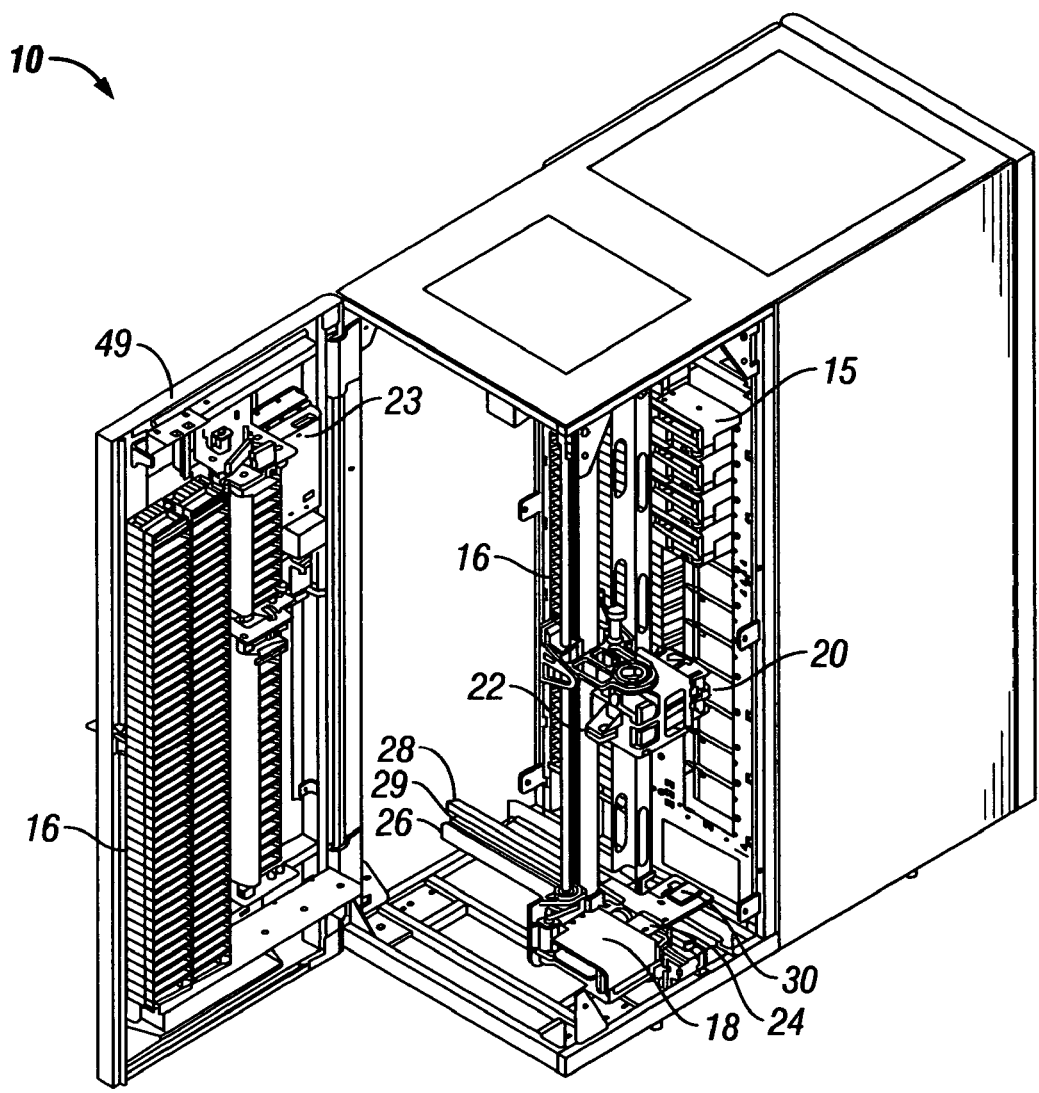
FIG. 1 is an isometric illustration of an automated data storage library employing an embodiment of the present invention.

Referring to FIG. 1, an automated data storage library 10 is configured in accordance with an embodiment of the present invention with a robot accessor 18 to access data storage cartridges stored in a plurality of storage shelves 16. The library 10 also comprises one or more data storage drives 15 which read and/or write data with respect to the data storage cartridges. As one example, the data storage cartridges may comprise magnetic tape cartridges, and the data storage drives 15 may comprise magnetic tape drives. Other types of removable media drives and cartridges may comprise magnetic media, such as hard disks, floppy disks, or any other type of magnetic media as is known to those of skill in the art. In addition, the removable media drives and cartridges may comprise optical media such as CD (Compact Disk), DVD (Digital Versatile Disk), optical tape, or any other optical media as is known to those of skill in the art. Still further, the removable media drives and cartridges may comprise electronic media such as CF (CompactFlash), SD (Secure Digital), xD (xD-Picture), Memory Stick, MMC (MultiMedia Card), MEMS (Micro-ElectroMechanical Systems) based storage, MRAM (Magnetoresistive Random Access Memory) or any other electronic media as is known to those of skill in the art.

The robot accessor 18 comprises a picker 20 configured to access and deliver data storage cartridges to and from the storage shelves 16 and the data storage drive(s) 15, and a drive system configured to move the robot accessor and to position the picker, at least such that the picker may be positioned to access and deliver the data storage cartridge(s). In the illustrated example, the drive system comprises a carriage 24 guided on a lower track 26 and on an upper track to move the carriage, and, hence picker 20, horizontally. The picker 20 is movable in the vertical direction to access the storage shelves and data storage drives.

An accessor sensor 22, such as an LED (Light Emitting Diode) emitter/detector, a bar code scanner, camera, and/or other type of reading system, such as a smart card reader, RFID (Radio Frequency Identification), or similar system, may be mounted on the picker 20, to "read" identifying information about the data storage cartridges.

The automated data storage library 10 may also comprise one or more operator panels 23 or other user interface, such as a web-based interface, which allows a user to interact with the library.

The automated data storage library may further comprise additional frames, and the track 26 may continue into the additional frames. In addition, the library may also comprise a second robot accessor, similar to the robot accessor 18. In one example, in the event of a failure or other unavailability of the robot accessor 18, or its picker 20, etc., the second robot accessor takes over.

An example of a data storage library which may implement the present invention is the IBM® 3584 UltraScalable® Tape Library.

Figure 2A:
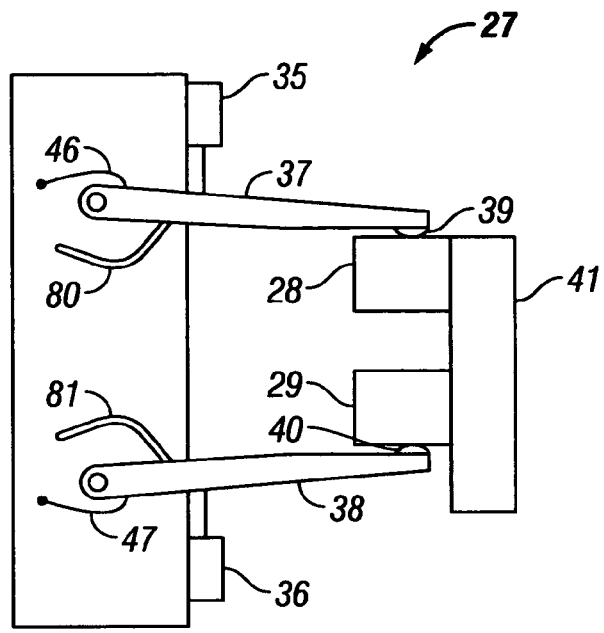
FIGS. 2A and 2B are diagrammatic illustrations of an embodiment of a bus bar relay of the automated data storage library of FIG. 1 respectively engaging and disengaging a bus bar in accordance with the present invention.
Figure 2B:
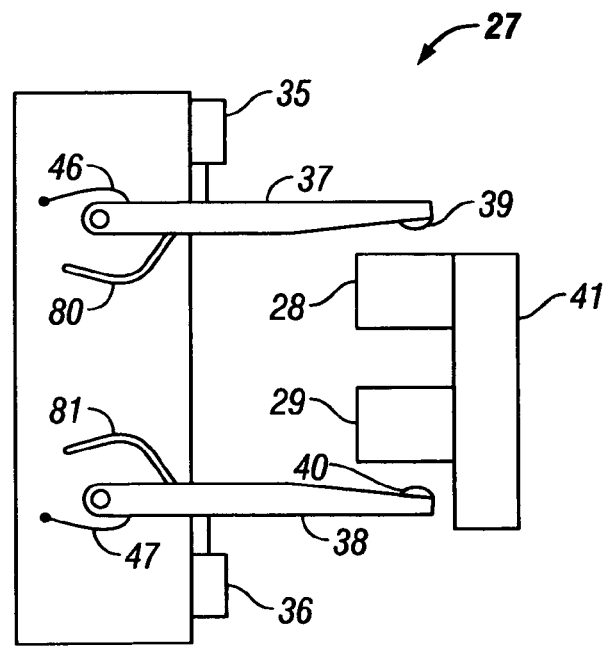
Figure 3:
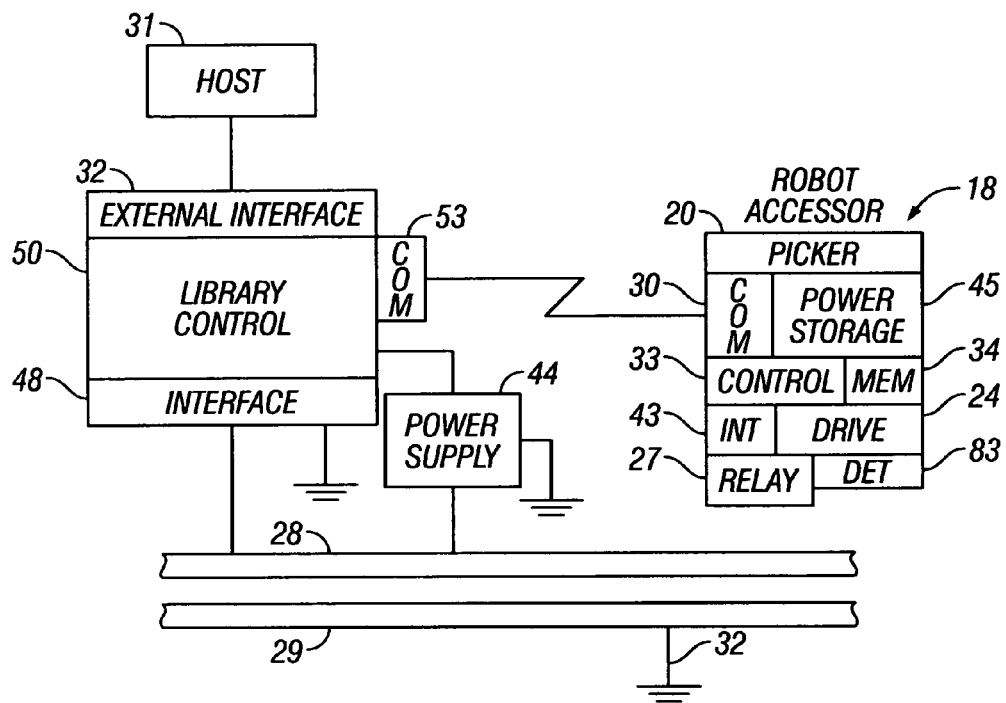
FIG. 3 is a block diagrammatic illustration of an embodiment of the communications systems for the robot accessor in the automated data storage library of FIG. 1.

Referring additionally to FIGS. 2A, 2B and 3, the robot accessor 18 is provided with a bus bar relay 27 to provide burst communications when the robot accessor is stationary. Herein, a "stationary" robot accessor refers to motion as it relates to the bus bar 28, 29 of FIGS. 1, 2 and 3. In addition, "stationary" may refer to some amount of motion in that the accessor motion may be decelerating during engagement of the bus bar relay and may be accelerating during disengagement of the bus bar relay. The robot accessor may be stationary when there are no host commands to process. In one embodiment, host commands are received by one or more library controllers and then the commands are either forwarded to the robot accessor, or other commands or signals are sent to the robot accessor to provide the necessary cartridge movement. In addition, the robot accessor may be stationary during a cartridge put or get operation to/from a data storage drive 15 or to/from a storage slot. The robot accessor may need to be stationary during these actions to prevent damage to components of the accessor. Still further, the robot accessor may be stationary due to a failure of the robot accessor, or if the robot accessor runs out of power, as will be discussed. The bus bar relay 27 is configured to engage and disengage a bus bar 28, 29 of the library. The bus bar 28 may comprise any suitable material for carrying communication signals and is arranged generally parallel to the direction of motion of the robot accessor. In the illustrated embodiment, the bus bar 28 comprises a communication connection, and bus bar 29 is grounded 32. Alternatively, rather than grounding bus bar 29, bus bar 28, 29 may comprise a differential communication pair. Still further, there may be only one half 28 of bus bar 28, 29 and the ground connection may be provided through the contact of other metal parts of the library/accessor system. Still further, there may be more than two connections. In this case, additional connections may be provided for redundancy, for multiple communication channels, etc. Herein, "bus bar" refers to a temporary contact point for providing communication to an accessor, and "bus bar relay" refers to a mechanism for providing the temporary contact to the bus bar.

The automated data storage library 10 is part of a data storage system in which commands and data are provided from one or more hosts 31 via one or more external interfaces 32, and the library executes the commands and provides responses and requested data to the hosts 31. A host 31 may comprise a computer, workstation, server, virtual tape system, control unit, storage server, a storage control, a networked system, etc., as is known to those of skill in the art.

A robot control 33 may comprise a computer system, one or more processors, part or all of a distributed control system, FPGA (Field Programmable Gate Array), ASIC (Application Specific Integrated Circuit), discrete logic, or any other method of control as is known to those of skill in the art. A robot control 33, in one embodiment, comprises a memory 34 to store the computer program code of a computer program product to cause the programmable computer system, processor, FPGA, ASIC or other programmable logic to provide the desired operations of the robot accessor 18. The memory 34 may be integrated into a computer system, processor, FPGA, ASIC, or other device or system. Alternatively, the memory 34 may be a discrete memory or storage component. The memory may comprise electronic storage such as programmable logic, RAM (Random Access Memory), PROM (Programmable Read Only Memory), EEPROM (Electrically Erasable PROM), flash PROM, MRAM (Magnetoresistive RAM). Alternatively, the memory may comprise magnetic storage such as a hard disk drive, floppy drive, magnetic tape, etc. In addition, the memory may comprise optical storage such as an optical disk drive, optical tape, etc. Still further, the memory may comprise any memory or storage technology as is known to those of skill in the art. The computer program product may be supplied to the robot control 33, for example, by means of the operator interface 23 or a web user interface. The computer program product may also be provided from some other user or remote interface, a network, host computer, library service port, through a wireless connection, or by a diskette, DVD (Digital Versatile Disk), memory card, or compact-disk "CD", or any other method of providing a computer program product, as is known to those of skill in the art.

The robot control 33 is configured to operate the drive system, e.g. carriage 24, to move the robot accessor 18, and may operate the picker 20.

In accordance with an embodiment of the present invention, the robot control 33 is configured to operate the bus bar relay 27, either directly or indirectly, to engage the bus bar 28, 29 when the robot accessor is stationary, and to disengage the bus bar 28, 29 when the robot accessor is being moved. In a preferred embodiment, the bus bar relay 27 engages the bus bar 28, 29 when there is no power present on robot accessor 18, or the robot accessor stops due to a malfunction.

Referring to FIGS. 2A and 2B, the bus bar relay 27, in one embodiment, comprises a pair of single pole single throw relays, comprising actuators 35 and 36 which operate communication arms 37 and 38 to move relay contacts 39 and 40 into engagement with the bus bar 28, 29, and to disengage the relay contacts. The bus bar 28, 29 may be supported by frame support 41, and communication bar 28 is insulated from the frame support.

In an alternative embodiment, the bus bar relay 27 may comprise multiple pole single throw contacts. Further, the bus bar relay 27 may comprise redundant relay elements to guard against single relay failure. Still further, the contacts may be sufficiently durable, for example, hardened contacts, so as to tolerate motion in contact with the bus bar 28, 29 to allow for electrical contact during acceleration and deceleration of the accessor 18, or in the event of a failure of actuators 35 and 36 or for long enough to allow the robot accessor to be moved out of the way along the rails for repair. In one embodiment, the actuators 35 and 36 are operated electrically in a similar way that a relay is actuated electrically. In another embodiment, the actuators 35 and 36 are operated through a mechanical link to the accessor drive or rail system. When the accessor 18 begins to move, the communication arms 37, 38 are mechanically driven away from the bus bar 28, 29.

Referring to FIGS. 2A, 2B and 3, the robot accessor 18 comprises an accessor communication interface 43. Wires 46 and 47 may provide a direct communication link between the relay contacts 39 and 40 and the accessor communication interface 43. The wires 46 and 47 may be arranged to minimize the flexing of the wires to prolong their durability and reliability.

The robot control 33 is configured to operate the accessor communication interface 43 to provide communication capability with a library communication interface 48 via the bus bar relay 27 and the bus bar 28, 29 when the bus bar relay 27 engages the bus bar 28, 29.

A library controller 50, which may comprise one or more processors, may be in communication with the library communication interface 48, and, when the communication capability is provided by the accessor communication interface 43 and bus bar relay 27, the library controller 50 and the robot accessor 18 communicate in burst mode, for example, the library controller providing commands or signals to the robot control 33 to make desired moves, or providing address information so that a robot control 33 of the robot 18 can determine the desired moves. Additionally, the robot control 33 may provide information from the sensor 22 of FIG. 1 mounted on the robot accessor or picker, such as information read from the shelves, markers within the library, and/or from labels of the data storage cartridges, and communicate the information to the library controller 50. The accessor communication interface 43 and the library communication interface 48 may comprise a serial interface such as RS-232 (Recommended Standard), RS-422, CAN (Controller Area Network), USB (Universal Serial Bus), IEEE 1394, Ethernet, etc. Alternatively, the accessor communication interface 43 and the library communication interface 48 may comprise a parallel interface such as SCSI, IEEE 1284, etc. Still further, any commercial or proprietary communication interfaces may be use, as is known to those of skill in the art.

Herein, "communication capability" comprises any suitable operation which provides the ability to communicate via digital and/or analog signaling.

Referring to FIGS. 1, 2A, 2B and 3, in a further embodiment, the automated data storage library additionally comprises a second communication system 30, 53 between the robot accessor 18 and the automated data storage library, the second communication system operable at least when the robot accessor is moving.

The bus bar relay 27 is disengaged when the robot accessor 18 is moving, such that there is only burst communication when the robot accessor is stationary. The second communication system 30, 53 may therefore serve in a low bandwidth communication mode as compared to the communication bandwidth of the accessor interface 43, so as to be effective in a potentially high noise environment. The low bandwidth signaling may be as simple as a binary "on-off" coding, or more complicated coding or modulated signaling, and may comprise error correction techniques. An example of the signaling is that a constantly "on" signal from the robot accessor 18 indicates that the robot accessor is operating correctly, and/or moving, and an absence of a signal means that the robot accessor is experiencing trouble and/or is stopped. An example of signaling from the library to the robot accessor may be constantly "on" to indicate that the library is operating normally, and an absence of a signal means that power is about to go off. In one embodiment, the signaling from the library to the robot is used to indicate that it may not be safe for the robot to continue in motion. For example, a library access door 49 of FIG. 1 may have been opened and continued robot motion may comprise a safety hazard for the person opening the library access door. In this example, the robot ceases any motion when the signaling from the library to the robot indicated that a library access door may have been opened. A library access door may comprise a door, hatch, cover, panel, magazine, or any other structure or assembly that may provide access to any portion of the library that is not normally accessible. Because of the possible noise, a threshold time period may be established for an absence of a signal to be registered by the receiver. Alternatively, a threshold in a coding or modulated signaling system may comprise a duplication of the signaling codes, or a special "attention" code sequence may be utilized, as is known to those of skill in the art.

Referring to FIGS. 1 and 3, in a further embodiment of the present invention, the robot control 33 is additionally configured to stop the robot accessor 18 if, while the bus bar relay 27 is disenganged, communication of the second communication system is lost for a predetermined threshold, the thresholds discussed above.

The example of a secondary communication system 30, 53 illustrated in FIGS. 1 and 3 comprises an RF (radio frequency) communication system, as is known to those of skill in the art.

Figure 4:
FIG. 4 is a diagrammatic illustration of an optical communication system employed in one embodiment of the present invention in the communications system of FIG. 3.

FIG. 4 illustrates an alternative secondary communication system comprising an optical communication system 55, 57, having an optical source 58, 59, and an optical receiver 60, 61 at either side of the communication link, specifically at the robot accessor 18 and at the library communication interface 53. The optical sources and receivers may comprise LEDs and optical detectors, and the LEDs may be provided throughout the library to provide communication with the robot accessor at all points in the library. Alternatively, the optical sources may comprise lasers. It should be noted that there may not be a need for two receivers 60, 61 and/or two transmitters or sources 58, 59. This may be the case if there is only a need to determine library status or accessor status, and not both. In addition, there may not be a need for a secondary communication system at all. This may be the case if there are no safety concerns with a given library design. Still further, at the robot accessor 18, the accessor sensor 22 may also serve as the optical communication system 30. Further optical communication systems are also known to those of skill in the art.

Thus, the potentially noisy or intermittent nature of communication through RF or optical communications still is useable in the low bandwidth communication environment.

Figure 5:
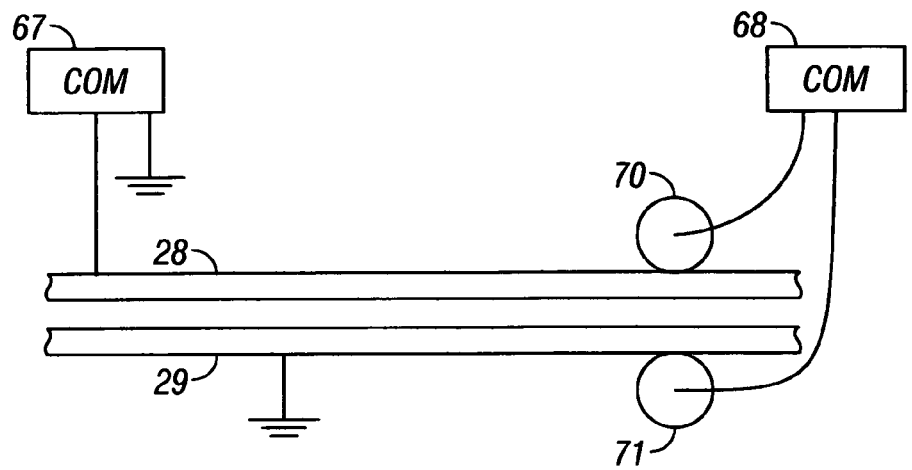
FIG. 5 is a diagrammatic illustration of a roller and bus communication system employed in one embodiment of the present invention in the communications system of FIG. 3.

FIG. 5 illustrates a further secondary communication system comprising a roller and bus communication system 67, 68 employing rollers 70 and 71 of robot accessor 18 to contact the bus 28 and ground 29, or a similar bus system, and to provide a low bandwidth communication, as discussed above, with respect to the library. Herein, such a system is termed a "bus bar contact". The roller and bus communication system 67, 68 is not well suited for high bandwidth communication during motion because the roller may induce noise, intermittent connections, etc. However, if high bandwidth communication is limited to periods where accessor motion is stopped, the roller and bus communication system 67, 68 may be used as the primary burst communication instead of the bus bar relay. In one embodiment, the roller and bus communication system 67, 68 actually provides the high bandwidth communication when the accessor is stopped. In a variation of this embodiment, a secondary communication system is used when the accessor is moving.

Figure 6:
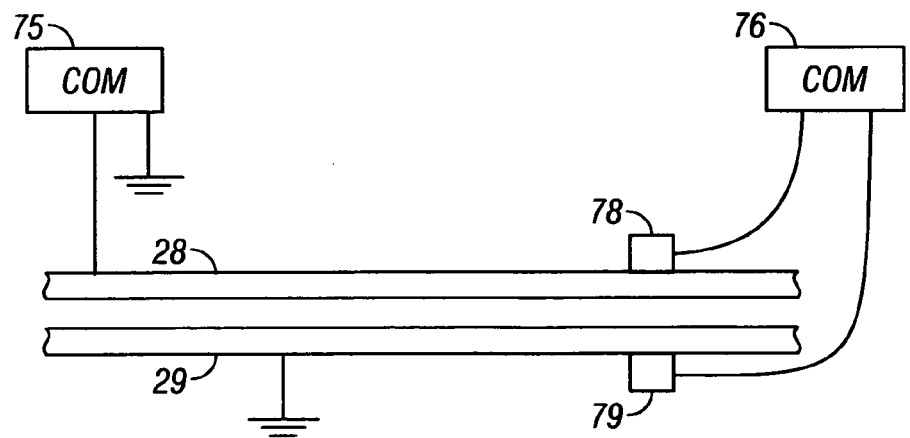
FIG. 6 is a diagrammatic illustration of a brush and bus communication system employed in one embodiment of the present invention in the communications system of FIG. 3.

FIG. 6 illustrates a further secondary communication system comprising a brush and bus communication system 75, 76 employing brushes 78 and 79 of robot accessor 18 to contact the bus 28 and ground 29, or a similar bus system, and to provide a low bandwidth communication, as discussed above, with respect to the library. Such a system is also termed a "bus bar contact". The brush and bus communication system 75, 76 is not well suited for high bandwidth communication during motion because the brush may induce noise, intermittent connections, etc. However, if high bandwidth communication is limited to periods where accessor motion is stopped, the brush and bus communication system 75, 76 may be used as the primary burst communication instead of the bus bar relay. In one embodiment, the brush and bus communication system 75, 76 actually provides the high bandwidth communication when the accessor is stopped. In a variation of this embodiment, a secondary communication system is used when the accessor is moving.

Thus, the intermittent nature of communication through rollers or brushes or similar bus bar contacts still is useable in the low bandwidth communication environment, and may even be used for high bandwidth communication when there is no motion.

Referring to FIGS. 2 and 3, a power supply 44 of the library may supply power (AC and/or DC) to the bus bar 28, 29. The power supply 44 comprises any suitable power supply as is known to those of skill in the art. A power storage system 45 is configured to receive power via the bus bar relay 27 when the bus bar relay engages the bus bar 28, 29. The communication signal may be modulated on the power signal. Alternatively, the communication signal may be capacitively coupled to the power signal. Still further, any method of combining power and communication signals may be used as is known to those of skill in the art.

Thus, both power and communications may be provided via the bus bar 28, 29 and the bus bar relay 27 when the robot accessor is stationary and the bus bar relay engages the bus bar. Alternatively, there may be separate arms 37, 38 and/or separate contacts 39, 40 and/or separate bus bars 28, 29 for communication and power.

The power storage system 45 may comprise a battery system, a capacitor system, and/or super-capacitor to store power, which systems are known to those of skill in the art. The power storage system 45 is arranged to receive power from the power supply 44 via the bus bar engaged bus bar relay, for example, by a direct connection to the relay contacts 39 and 40 via wires or cables 80 and 81 of FIGS. 2A and 2B. As discussed above, optionally, the bus bar may comprise one half 28 of the bus bar, and the ground connection may be provided through the contact of other metal parts.

The power supply system 45 stores the received power and may deliver the stored power to the picker 20, the drive system, the accessor communication interface 43, the bus bar relay 27, the robot control 33, 34, to any secondary communication system 30, and to any accessor sensor 22 of FIG. 1, if needed. Some or all of the components of the robot accessor 18 may receive power directly from the bus bar relay 27 or the bus bar contacts (FIGS. 5 and 6) when the robot accessor is stationary. In this case, the power supply system 45 may not be supplying any power while it is charging. Alternatively, the components of the robot accessor may always receive power from the power supply system 45, even when the accessor is stopped. In this case, the power supply system 45 may be charging at the same time that is supplying power. The power is supplied at the desired voltages and current capacities and of the desired type (e.g. AC and/or DC), as is known to those of skill in the art.

The robot control 33 of FIG. 3 may additionally be configured to determine if the bus bar relay 27 engages the bus bar 28, 29. For example, a detector 83 may sense the operation of the actuators 35, 36 of FIGS. 2A and 2B, for example, by current flow, inductance, etc.; may sense the position of arms 37, 38, for example, by a micro switch; or may sense the completion of the circuit, for example, by voltage or signal. Examples of such detectors are known to those of skill in the art.

The robot control senses the condition of the detector 83 and, if the bus bar relay engages the bus bar, provides a signal via the accessor communication interface 43, the bus bar relay 27, and the bus bar 28, 29 to indicate that the bus bar relay has engaged the bus bar. The library control 50 may receive and respond to the signal by activating the power supply 44. Thus, power may be supplied only when the robot accessor 18 is stationary. The robot control 33 may also provide a signal to indicate that the bus bar relay 27 is to be operated to disengage the bus bar 28, 29. The library control 50 may thus deactivate the power supply prior to the disengagement and avoid surges to the system. This may limit the amount of pitting that may occur on the contacts and bus bar due to arcing or sparking and thereby improve bus bar relay contact life and/or bus bar life. Alternatively, robot control 33 and library control 50 may determine that the bus bar relay 27 has engaged the bus bar 28, 29 by the fact that communication has been established on the bus bar, not requiring a detector 83. A time delay and/or a communication signal between the robot control 33 and the library control 50 may be used by library control 50 as an indication that it can activate power to the bus bar. A communication signal between the robot control 33 and the library control 50 may also be used to indicate that power should be removed from the bus bar because the robot accessor 18 is about to move. Alternatively, since movement of the robot accessor is typically related to host or library commands, library control 50 may remove power from the bus bar prior to sending any commands or signals to robot control 33 that may result in robot accessor motion. These approaches may require that the robot accessor 18 has power to begin with. If the robot accessor 18 has run out of power, the library control 50, or some other circuit coupled to the bus bar, may provide a detection method to allow the library control 50, or other circuit, to determine that the bus bar relay 27 has made contact with the bus bar. Examples of how library control 50, or some other circuit, may determine that bus bar relay 27 has made contact with the bus bar may comprise, measuring the impedance of the bus bar circuit, determining that an electrical load has been placed on the bus bar, determining that one or more circuits have been closed, etc. One skilled in the art will recognize that these methods may be employed with power circuits that do not require any actual involvement of library control 50. Time delays may be employed to ensure that the contacts are not bouncing or in partial contact when power is applied to, or removed from, the bus bar. Herein, activating a power supply may comprise turning power on, or it may comprise an increase in voltage and/or current output of the power supply. Deactivating a power supply may comprise turning the power supply off, or it may comprise a decrease in voltage and/or current output of the power supply.

Those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An automated data storage library, comprising:
    a plurality of storage shelves configured to store data storage cartridges;
    at least one data storage drive configured to read and/or write data with respect to said data storage cartridges;
    a bus bar;
    a library communication interface configured to communicate with said bus bar; and
    a robot accessor comprising:
        a picker configured to access and deliver at least one said data storage cartridge to and from said storage shelves and said at least one data storage drive;
        a drive system configured to move said robot accessor and to position said picker, at least such that said picker may be positioned to access and deliver said at least one data storage cartridge;
        an accessor communication interface;
        a bus bar relay configured to engage and disengage said bus bar; and
        a robot control configured to operate said drive system to move said robot accessor, to operate said picker to access and deliver said at least one data storage cartridge, to operate said bus bar relay to engage said bus bar when said robot accessor is stationary, and to operate said accessor communication interface to provide communication capability with said library communication interface via said bus bar relay and said bus bar when said bus bar relay engages said bus bar.

2. The automated data storage library of claim 1, additionally comprising a second communication system between said robot accessor and said automated data storage library, said second communication system operable at least when said robot accessor is moving.

3. The automated data storage library of claim 2, wherein said second communication system is a low bandwidth communication system as compared to communication bandwidth between said accessor communication interface and said library communication interface via said bus bar relay and said bus bar.

4. The automated data storage library of claim 2, wherein said second communication system comprises an optical communication system.

5. The automated data storage library of claim 2, wherein said second communication system comprises an RF communication system.

6. The automated data storage library of claim 2, wherein said second communication system comprises a roller and bus communication system.

7. The automated data storage library of claim 2, wherein said second communication system comprises a brush and bus communication system.

8. The automated data storage library of claim 2, wherein said robot control is additionally configured to stop said robot accessor if, while said bus bar relay is disengaged, communication of said second communication system is lost for a predetermined threshold.

9. The automated data storage library of claim 2, wherein said robot control is additionally configured to stop said robot accessor if, while said bus bar relay is disengaged, said second communication system indicates that a library access door is opened.

10. The automated data storage library of claim 1, additionally comprising a power supply configured to supply power to said bus bar; and wherein said robot accessor additionally comprises a power storage system configured to receive power via said bus bar relay when said bus bar relay engages said bus bar, to store said received power, and to deliver said stored power to said robot accessor at least when said bus bar relay is disengaged.

11. The automated data storage library of claim 10, wherein said robot control is configured to determine if said bus bar relay engages said bus bar and, if so, to signal said engagement via said accessor communication interface, whereby said power supply may be activated.

12. The automated data storage library claim 10, wherein said automated data storage library is configured to determine if said bus bar relay engages said bus bar and, if so, to activate said power supply.

13. The automated data storage library claim 10, wherein said automated data storage library deactivates said power supply prior to sending any commands or signals to said robot accessor that may result in robot accessor motion.

14. A robot communication system configured for a robot accessor of an automated data storage library, said robot accessor having a drive system to move said robot accessor, said automated data storage library having a bus bar, said robot communication system comprising:
- an accessor communication interface;
- a bus bar relay configured to engage and disengage said bus bar; and
- a robot control configured to operate said drive system to move said robot accessor, to operate said bus bar relay to engage said bus bar when said robot accessor is stationary, and to operate said accessor communication interface to provide communication capability over said bus bar relay and said bus bar when said bus bar relay engages said bus bar.

15. The robot communication system of claim 14, additionally comprising a second communication system of said robot accessor, said second communication system operable at least when said robot accessor is moving.

16. The robot communication system of claim 15, wherein said second communication system is a low bandwidth communication system as compared to communication bandwidth of said accessor interface.

17. The robot communication system of claim 15, wherein said second communication system comprises an optical communication system.

18. The robot communication system of claim 15, wherein said second communication system comprises an RF communication system.

19. The robot communication system of claim 15, wherein said second communication system comprises a roller communication system configured to operate with a bus of said automated data storage library.

20. The robot communication system of claim 15, wherein said second communication system comprises a brush communication system configured to operate with a bus of said automated data storage library.

21. The robot communication system of claim 15, wherein said robot control is additionally configured to stop said robot accessor if, while said bus bar relay is disengaged, communication of said second communication system is lost for a predetermined threshold.

22. The robot communication system of claim 15, wherein said robot control is additionally configured to stop said robot accessor if, while said bus bar relay is disengaged, said second communication system indicates that a library access door is opened.

23. The robot communication system of claim 14, additionally comprising a power storage system configured to receive power via said bus bar relay when said bus bar relay engages said bus bar, to store said received power, and to deliver said stored power to said robot accessor at least when said bus bar relay is disengaged.

24. The robot communication system of claim 23, wherein said robot control is configured to determine if said bus bar relay engages said bus bar and, if so, to signal said engagement via said accessor communication interface, whereby said power supply may be activated.

25. A data storage system comprising:
- at least one host; and
- an automated data storage library, comprising:
  - a plurality of storage shelves configured to store data storage cartridges;
  - at least one data storage drive configured to read and/or write data with respect to said data storage cartridges;
  - at least one external interface configured to communicate with said at least one host;
  - a bus bar;
  - a library communication interface configured to communicate with said bus bar; and
  - a robot accessor comprising:
    - a picker configured to access and deliver at least one said data storage cartridge to and from said storage shelves and said at least one data storage drive;
    - a drive system configured to move said robot accessor and to position said picker, at least such that said picker may be positioned to access and deliver said at least one data storage cartridge;
    - an accessor communication interface;
    - a bus bar relay configured to engage and disengage said bus bar; and a robot control configured to operate said drive system to move said robot accessor, to operate said picker to access and deliver said at least one data storage cartridge, to operate said bus bar relay to engage said bus bar when said robot accessor is stationary, and to operate said accessor communication interface to provide communication capability with said library communication interface via said bus bar relay and said bus bar when said bus bar relay engages said bus bar.

* * * * *